(12) United States Patent
Pardal et al.

(10) Patent No.: US 9,028,610 B2
(45) Date of Patent: May 12, 2015

(54) PROCESS FOR THE PRODUCTION OF A RAPID HYDRAULIC BINDER

(75) Inventors: Xiaolin Pardal, Lyons (FR); Pascal Dion, Saint Chef (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 14/236,565

(22) PCT Filed: Jul. 13, 2012

(86) PCT No.: PCT/EP2012/063757
§ 371 (c)(1),
(2), (4) Date: Jan. 31, 2014

(87) PCT Pub. No.: WO2013/017391
PCT Pub. Date: Feb. 7, 2013

(65) Prior Publication Data
US 2014/0174325 A1 Jun. 26, 2014

(30) Foreign Application Priority Data
Aug. 2, 2011 (FR) ...................................... 11 57076

(51) Int. Cl.
*C04B 7/02* (2006.01)
*C04B 7/52* (2006.01)
*C04B 28/18* (2006.01)

(52) U.S. Cl.
CPC .... *C04B 7/02* (2013.01); *C04B 7/52* (2013.01)

(58) Field of Classification Search
CPC ............ C04B 7/02; C04B 7/52; C04B 24/04; C04B 24/06; C04B 24/12; C04B 24/18; C04B 24/20; C04B 24/22; C04B 24/26; C04B 24/128
USPC ......................... 106/638, 719, 739
See application file for complete search history.

(56) References Cited

U.S. PATENT DOCUMENTS

| | | | |
|---|---|---|---|
| 4,098,613 A | 7/1978 | Maravilla et al. | |
| 2012/0270969 A1* | 10/2012 | Bichler et al. | 524/5 |

FOREIGN PATENT DOCUMENTS

| | | |
|---|---|---|
| EP | 1 731 491 | 12/2006 |
| FR | 2 196 975 | 3/1974 |
| GB | 1 387 075 | 3/1975 |
| GB | 2 139 208 | 11/1984 |
| WO | WO 2006/032785 | 3/2006 |
| WO | WO 2006/032786 | 3/2006 |

OTHER PUBLICATIONS

Derwent-Acc-No. 2012-H74831, abstract of Chinese Patent Specification No. CN 102485681 (Jun. 2012).*
International Preliminary Report on Patentability as issued for International Application No. PCT/EP2012/063757, dated Feb. 13, 2014.
Rogers, D.E., "Hydraulic Cement from the By-Product of Geothermal Water Desilication," Cement and Concrete Research, vol. 9, No. 6, 1979, pp. 713-722.
Heller, T., et al., "Cement additives based on PCE," Materials Science, ZKG International, vol. 64, No. 2, 2011, pp. 40-54.
Kato, A., et al., "Manufacture of high early-strength portland cement," Chemical Abstracts, No. 6, Feb. 5, 1990, 1 page.
International Search Report as issued for International Application No. PCT/EP2012/063757, dated Jan. 23, 2013.

* cited by examiner

*Primary Examiner* — Anthony J Green
(74) *Attorney, Agent, or Firm* — Pillsbury Winthrop Shaw Pittman LLP

(57) ABSTRACT

A process for the production of a hydraulic binder, includes co-grinding a clinker and 0.1 to 5% by dry mass relative to the mass of clinker, of a material including more than 15% by mass of calcium silicate hydrate relative to the solid fraction of the material.

9 Claims, 1 Drawing Sheet

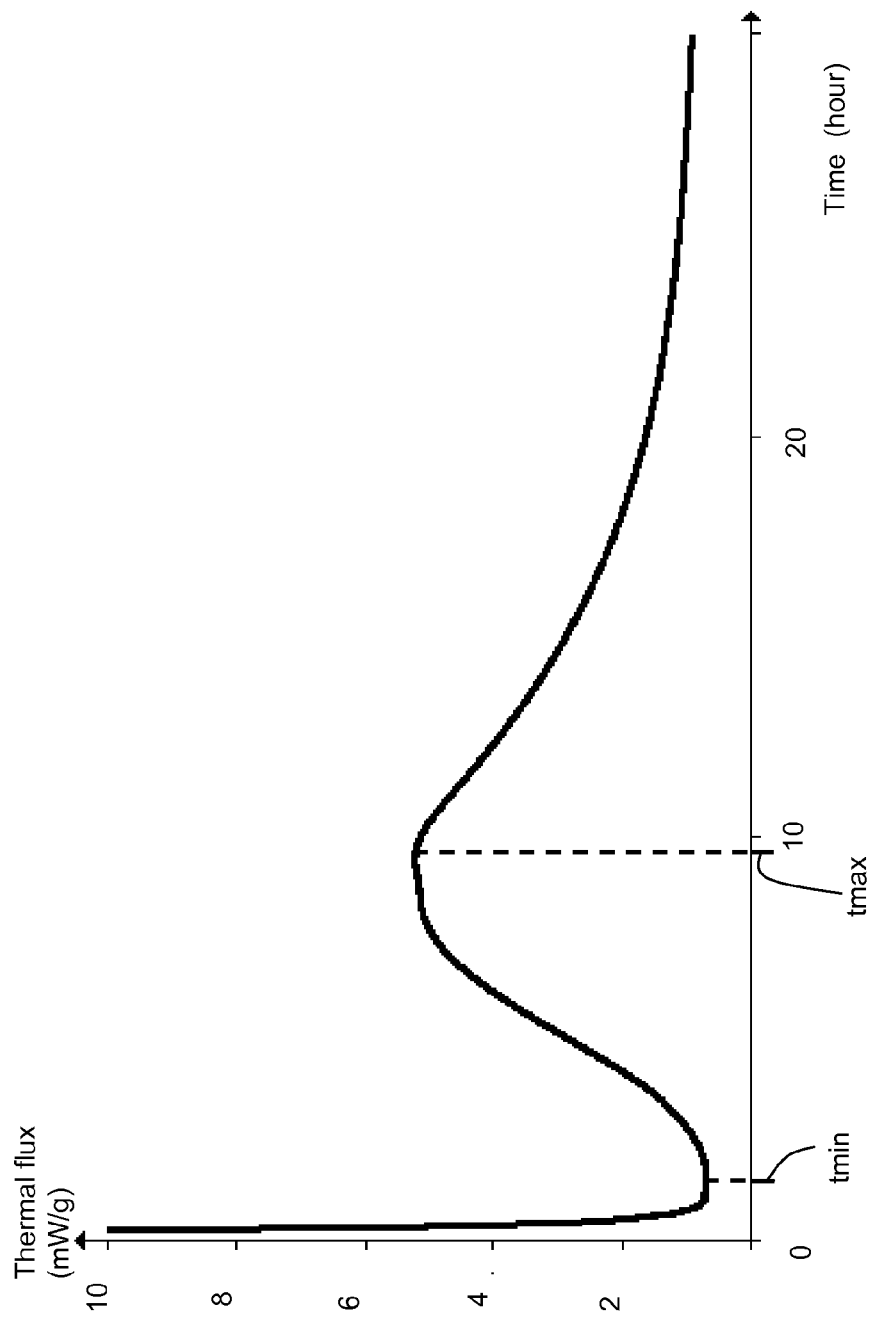

PROCESS FOR THE PRODUCTION OF A RAPID HYDRAULIC BINDER

CROSS-REFERENCE TO RELATED APPLICATIONS

This is the U.S. National Stage of PCT/EP2012/063757, filed Jul. 13, 2012, which in turn claims priority to French Patent Application No. 1157076, filed Aug. 2, 2011, the entire contents of both applications are incorporated herein by reference in their entireties.

The present invention relates to a process for the production of a rapid hydraulic binder.

A hydraulic binder is a material which sets and hardens by hydration, for example a cement. The setting corresponds to the passage to the solid state by chemical hydration reaction of the hydraulic binder. The setting is generally followed by a hardening period which corresponds to the phase during which the hydraulic binder's mechanical strength increase, after the end of the setting period. A hydraulic composition, for example a concrete, corresponds to a mix of a hydraulic binder, water, optionally aggregates and optionally admixtures.

For certain applications, it is desirable to accelerate the setting of a hydraulic composition. This is the case, for example for the use of concrete during cold weather, for rapid formwork removal, for the production of pre-cast elements, sealing, waterproofing, projected concretes, facer coatings, etc.

Setting or hardening acceleration may be obtained by adding an accelerating agent to the hydraulic composition. The accelerating agent is, for example calcium chloride, calcium nitrite, calcium nitrate, potassium sulphate, sodium sulphate, lithium sulphate and lime in various forms, for example, quick lime or hydrated lime. The accelerating agent is generally added during the production of the hydraulic composition.

However, in order to avoid the additional step of adding the accelerating agent to the hydraulic composition, it may be desirable to use a specific hydraulic binder which induces an acceleration of the setting of the hydraulic composition. Such a hydraulic binder is generally called a rapid hydraulic binder. Hydraulic compositions, for example concretes, using such hydraulic binders develop high short-term mechanical strength after mixing the hydraulic binder, the aggregates and the water.

Most known concretes comprise Portland cement. Portland cement mainly comprises Portland clinker and calcium sulphate. During the production of the cement, the clinker is ground with the calcium sulphate, which may for example be added in the form of gypsum, hemi hydrate or anhydrite, to obtain Portland cement.

A rapid hydraulic binder may be obtained by grinding the clinker more finely. However, it is then necessary to modify the grinding conditions of the clinker for the rapid hydraulic binder compared to a clinker for a known hydraulic binder. This is difficult for industrial-scale installations.

The present invention relates to a process for the production of a hydraulic binder, said process comprising co-grinding a clinker and 0.1 to 5% by dry mass relative to the mass of clinker, of a material comprising more than 15% by mass of calcium silicate hydrate relative to the solid fraction of the material.

The present invention aims at obtaining at least one of the following objectives:

to provide a new process for the production of a rapid hydraulic binder which does not necessitate many modifications compared to a process for the production of a known hydraulic binder;

the rapid hydraulic binder obtained according to the present invention may be used to make and/or repair road pavements;

the rapid hydraulic binder obtained according to the present invention may be used for rapid formwork removal of concrete parts, in particular to make concrete walls with rapid formwork removal and to make pre-cast beams or slabs;

the rapid hydraulic binder obtained according to the present invention may be used to accelerate handling of pre-cast concrete parts;

that the rapid hydraulic binder obtained according to the present invention may be used to produce a concrete element pre-stressed by cables by making it possible to more rapidly release the tension exerted on the cables embedded in the concrete.

In this description including the accompanying claims, unless otherwise specified, the proportions given in percentages correspond to mass proportions.

Preferably, the hydraulic binder is a cement. The cement is, for example as defined in the NF EN 197-1 Standard. Preferably, the cement is a Portland cement.

The clinker is preferably the product obtained after burning (clinkerisation) of a mix (the raw meal) composed, among others, of limestone and for example clay. Preferably the clinker is a Portland clinker as defined in the NF EN 197-1 Standard.

The Portland clinker may be a clinker used to produce known Portland cements, and in particular the cements described in the NF EN 197-1 Standard. It is possible for example to use a clinker used to produce a CEM I, CEM II, CEM III, CEM IV or CEM V cement according to the NF EN 197-1 Standard.

The Portland clinker may have a $D_v90$ before the co-grinding step, which varies from 1 to 30 mm, preferably from 5 to 20 mm. The $D_v90$ corresponds to the $90^{th}$ percentile of the particle size distribution by volume of the particles. That is, 90% of the particles have a size that is less than $D_v90$ and 10% have a size that is greater than $D_v90$.

In the remaining description, a particle of a material may correspond to both individual particles of the material but also to an agglomerate of individual particles of the material. In this case, the value of the $D_v90$ takes into account the presence of the agglomerates of individual particles. The term <<particle>> as used within the scope of the present invention should be understood in a broad sense and correspond not only to compact particles having more or less a spherical shape, but also to angular particles, flattened particles, particles in the shape of a flake, particles in the form of fibres, etc. The <<size>> of the particles used within the scope of the present invention is to be understood to mean the smallest transverse dimension of the particles.

The average sizes and distributions of particles may be determined by laser granulometry (in particular used a Malvern MS2000 laser granulometer) for the particles with a size less than about a hundred micrometers, or by sieving for particles with a size greater than about a hundred micrometers.

The Blaine Specific Surface may be determined as described in the EN 196-6 Standard, paragraph 4.

The BET Specific Surface may be measured using a SA 3100 analyser from Beckman Coulter with nitrogen as the adsorbed gas.

The process of the present invention comprises the co-grinding of a clinker and 0.1 to 5%, preferably 0.2 to 4%, more preferably 0.3 to 3%, by dry mass relative to the mass of clinker, of the material comprising more than 15% by mass of calcium silicate hydrate relative to the solid fraction of the material.

The proportion of calcium silicate hydrate in the material may be measured by nuclear magnetic resonance of the isotope 29 of the silicon.

The mix comprising the clinker and the material may have a $D_v90$ after the co-grinding step, that varies from 5 to 100 μm, preferably from 15 to 80 μm, more preferably from de 25 to 45 μm, most preferably from 25 to 40 μm.

The Blaine Specific Surface of the mix comprising the clinker and the material may vary, after the co-grinding step from 2500 $cm^2/g$ to 10000 $cm^2/g$, preferably from 2800 $cm^2/g$ to 9000 $cm^2/g$, more preferably from 3000 $cm^2/g$ to 7000 $cm^2/g$.

The material may correspond to a material obtained by hydration of a cement paste. The hydration step may be followed by a hardening step of the cement paste and a grinding step of the hardened cement paste. In this case, the calcium silicate hydrate may be in the form of a powder. When the calcium silicate hydrate is in the form of a powder obtained from a hardened cement paste, the particles of the calcium silicate hydrate may have, for example, a $D_v90$ before the co-grinding step, that varies from 10 to 100 μm, preferably from 15 to 80 μm, more preferably from 20 to 50 μm. The particles of the powder then generally correspond to agglomerates.

The cement paste may be kept in the form of a suspension, for example a slurry, in particular by providing a high water/cement ratio. When it is obtained from a cement paste, the material generally comprises other elements in addition to the calcium silicate hydrate, for example portlandite, ettringite. Preferably, the material comprises more than 30%, more preferably more than 40%, most preferably more than 50%, by mass of calcium silicate hydrate. The cement paste may be made with Portland cements, ground Portland clinkers, blended Portland cements or mixtures of these elements.

The cement paste may be in the form of a gel, obtained by centrifugation of the suspension cited herein above. After centrifugation of the suspension, four fractions are obtained (from bottom to top):
fraction containing particles of large particle size;
fraction containing particles of small particle size;
fraction containing a gel comprising CSH;
fraction containing an aqueous solution.

The gel fraction is then extracted to be used for co-grinding. An example of centrifugation protocol is given in example 8 herein after.

When the material is in the form of a gel or a suspension, the process of the present invention comprises the co-grinding of a clinker and 0.5 to 15%, preferably 0.6 to 10%, by wet mass relative to the mass of clinker, of the material.

The material may be obtained by synthesis from a source of calcium (for example calcium oxide (CaO) or a calcium salt), a source of silicates (for example silicon dioxide ($SiO_2$) or a silicate salt) and water ($H_2O$). The precise nature of the calcium silicate hydrate is not critical and will depend upon the production process used. By way of example, it may be calcium silicate hydrate according to formula $Ca_6Si_6O_{17}(OH)_2$.

Preferably, the calcium silicate hydrate is in the form of a powder, a gel or in suspension, for example an aqueous suspension.

The BET Specific Surface of the particles of calcium silicate hydrate may vary, for example, before the co-grinding step, from 5 $m^2/g$ to 500 $m^2/g$, preferably from 10 $m^2/g$ to 300 $m^2/g$, more preferably from 30 $m^2/g$ to 180 $m^2/g$.

The grinding step of a solid preferably corresponds to a division step of the solid to reduce the size of the particles and/or to increase their specific surface (developed surface of the powder per unit by mass).

The grinding may be carried out by a grinding mill comprising for example:
a single mill, for example a ball mill;
a single mill followed by a separator;
a primary mill, for example a roller press, associated with a finishing mill, for example a horizontal mill (for example of the Horomill™ type), or a ball mill or an air-jet mill, followed by a separator.

The grinding step may be carried out in several successive steps. The mix may, for example, be ground in two steps. In the first step, the mix may be first ground until an intermediary Blaine specific surface is obtained. A high-efficiency separator, known as second or third generation separator, may be used in this first step to separate the mix having the suitable fineness and the mix having to re-pass through the grinder. In a second step, the mix may first pass through a very high efficiency separator, in order to separate the particles of the mix having a Blaine specific surface greater than or equal to the desired Blaine specific surface and the particles of the mix having a Blaine specific surface less than the desired Blaine specific surface. The particles of the mix having a Blaine specific surface greater than or equal to the desired Blaine specific surface may be used per se. The particles of the mix having a Blaine specific surface less than the desired Blaine specific surface may be ground again until obtaining the desired Blaine specific surface. The mills that may be used in the two steps are for example a ball mill, a roller press, a horizontal mill (for example of the Horomill™ type).

A grinding agent may be co-ground with the clinker and the material, the quantity of the grinding agent being 0.01 to 0.5%, preferably 0.02 to 0.25%, more preferably 0.025 to 0.1%, by mass expressed as dry extract relative to the mass of clinker. A grinding agent makes it possible to reduce the agglomeration of the particles of the mix between each other and on the grinding means during the co-grinding step. It therefore makes it possible to reduce the consumption of energy, generally by at least 10%, to carry out the grinding step in order to obtain a hydraulic binder having a same fineness.

Suitable examples of grinding agents include mono alcohols, in particular primary alcohols, for example methanol or ethanol; poly alcohols, for example alkylene ether glycols or poly glycols, in particular ethylene glycol, diethylene glycol, propylene glycol or polypropylene glycol; alcohol-amines (for example monoethanol amine, diethanolamine or triethanolamine); butyl amine; methyl siloxanes; amine acetates; anionic surfactants; phenolic compounds; poly glycerols; polyoxy alkylene polycarboxylates; and fatty acids. Preferably, the grinding agent comprises triethanolamine.

A plasticizer or superplasticizer may be co-ground with the clinker, the material and optionally the grinding agent, the quantity of the plasticizer or superplasticizer being 0.05 to 3%, preferably 0.05 to 1%, more preferably 0.05 to 0.5%, by mass expressed as dry extract relative to the mass of clinker.

Suitable plasticizers and superplasticizers are described in the Concrete Admixtures Handbook, Properties Science and Technology, V.S. Ramachandran, Noyes Publications, 1984.

A plasticizer, (also called water reducer) is for example an admixture, which, without modifying the consistency, makes it possible to reduce the water content of a given concrete, or which, without modifying the water content, increases the slump/spread of the concrete, or which produces the two effects at the same time. A plasticizer reduces the amount of mixing water of concrete for a given workability by typically 10-15%. Plasticizers include, for example lignosulphonates, hydroxycarboxylic acids, carbohydrates, and other specialized organic compounds, for example glycerol, polyvinyl alcohol, sodium alumino-methyl-siliconate, sulfanilic acid and casein.

The plasticizer may also be a superplasticizer. Superplasticizers belong to a new class of water reducers chemically different from the normal water reducers and capable of reducing water contents by about 30%. The superplasticizers have been broadly classified into four groups: sulphonated naphthalene formaldehyde condensate (SNF) (generally a sodium salt); sulphonated melamine formaldehyde condensate (SMF); modified lignosulfonates (MLS); and others. More recent superplasticizers comprise polycarboxylic compounds such as polycarboxylates, e.g. polyacrylates. The superplasticizer is preferably a new generation superplasticizer, for example a copolymer comprising polyethylene glycol as graft chain and carboxylic functions in the main chain such as a polycarboxylic ether. For example, the ADVA® Flow 400 admixture is a superplasticizer of the PCP type (polyethylene polycarboxylate glycol). Sodium polysulphonate-polycarboxylates and sodium polyacrylates may also be used. In order to reduce the total alkali content, the superplasticizer may be used as a calcium salt rather than a sodium salt.

The superplasticizer may comprise a polyoxy alkylene polycarboxylate (also called PCP). It is for example a polyoxy ethylene polycarboxylate/polyoxy proplyene polycarboxylate which corresponds to a copolymer of acrylic acids and/or methacrylic acids, their esters of polyoxy ethylene/polyoxy propylene (POE/POP) or of their ethers of POE/POP. The expression <<polyoxy ethylene/polyoxy propylene>> is to be understood in the present description as polyoxy ethylene, or polyoxy ethylene and polyoxy propylene.

Preferably, the superplasticizer is selected from polyoxy ethylene/polyoxy proplyene polycarboxylates, polynaphtalene sulphonates, lignosulfonates, polymelamine sulphonates and mixtures thereof. In particular, the superplasticizer is preferably a polyoxy ethylene polycarboxylate.

The process may further comprise the co-grinding with the clinker or the addition to the hydraulic binder of a source of $SO_3$ so that the quantity of $SO_3$ in the hydraulic binder is from 1 to 10%, preferably from 1 to 7%, more preferably from 2 to 5%, expressed as dry mass relative to the mass of the hydraulic binder (clinker+optional mineral addition).

The $SO_3$ may be supplied by the various constituents of the clinker but also by the calcium sulphate generally used for sulphate additions to the clinker (for example as described in the NF EN 197-1 Standard, paragraph 5.4.). Preferably, the source of $SO_3$ is calcium sulphate.

Where calcium sulphate is used in the process of the present invention, the calcium sulphate may be gypsum (calcium sulphate dihydrate, $CaSO_4.2H_2O$), hemi hydrate ($CaSO_4.\frac{1}{2}H_2O$), anhydrite (anhydrous calcium sulphate, $CaSO_4$) and mixtures thereof. The gypsum and anhydrite exist in the natural state. Calcium sulfate produced as a by-product of certain industrial processes may also be used.

The quantity of $SO_3$ may, for example, be determined according to the method described in the EN 196-2 Standard, paragraph 8.

The process according to the present invention may comprise a co-grinding step of the clinker, the material, optionally a grinding agent and optionally a plasticizer or superplasticizer with the source of $SO_3$.

The process may further comprise the co-grinding with the clinker or the addition to the hydraulic binder of 1 to 95%, preferably 5 to 80%, more preferably 5 to 35%, expressed as dry mass, relative to the mass of clinker, of a mineral addition or of a mix thereof. The mineral addition has, for example an average size of particles less than 100 µm. The mineral addition may comprise pozzolanic or non-pozzolanic materials or a mixture thereof.

The pozzolanic or non-pozzolanic materials may be added before the co-grinding step in order to be co-ground with the other components. They may then be in a crushed form. The pozzolanic or non-pozzolanic materials may also be added to the hydraulic binder after the co-grinding step.

An example of mineral addition corresponds to slag, in particular to ground blast furnace slag.

Suitable pozzolanic materials include silica fume, also known by the name of micro-silica, which is for example a by-product of the production of silicon or ferrosilicon alloys. It is known as a reactive pozzolanic material. Its main constituent is amorphous silicon dioxide. The individual particles generally have a size of approximately 5 to 10 nm. The individual particles may agglomerate to form aggregates of 0.1 to 1 µm. The 0.1 to 1 µm aggregates may agglomerate to form aggregates of 20 to 30 µm. Silica fume generally has a BET specific surface of 10-30 m$^2$/g.

Other pozzolanic materials comprise fly ash, which generally has a $D_V10$ greater than 10 µm and a $D_V90$ less than 120 µm and has, for example a $D_V50$ from 30 to 50 µm. The $D_V50$ corresponds to the 50$^{th}$ percentile of the size distribution by volume of the particles. In other words, 50% of the particles have a size that is less than the $D_V50$ and 50% have a size that is greater than the $D_V50$. The $D_V10$ corresponds to the 10$^{th}$ percentile of the size distribution by volume of the particles. In other words, 10% of the particles have a size that is less than the $D_V10$ and 90% have a size that is greater than the $D_V10$.

Other pozzolanic materials comprise aluminosilicate-rich materials such as metakaolin and natural pozzolans with volcanic, sedimentary, or diagenic origins.

Suitable non-pozzolanic materials comprise materials containing calcium carbonate (for example ground or precipitated calcium carbonate). Ground calcium carbonate may, for example be Durcal® 1 (OMYA, France). The non-pozzolanic materials may be a ground quartz, for example C400 which is a substantially non-pozzolanic filling material supplied by Sifraco, France. A single non-pozzolanic material or a mix of non-pozzolanic materials may be used, for example ground calcium carbonate, ground quartz or precipitated calcium carbonate or a mixture thereof. A mix of pozzolanic materials or a mix of pozzolanic and non-pozzolanic materials may also be used.

Preferably, the mineral addition has, before the grinding step, a $D_V90$ which varies from 10 µm to 30 mm.

The hydraulic binder obtained by the process according to the invention may be used for the production of a hydraulic composition which corresponds, for example, to the mix of the hydraulic binder, water, optionally aggregates and optionally admixtures. Preferably, the hydraulic composition is a concrete, a mortar or a cement slurry.

The aggregates may comprise gravel, coarse aggregates and/or sand. The sand corresponds, for example, to aggregates of an average distribution size comprised from 0 to 6 mm, preferably from 0 to 4 mm. The coarse aggregates correspond, for example, to aggregates having a size distribution comprised from 4 to 20 mm. The gravel corresponds, for example, to aggregates having a size distribution greater than 20 mm. The aggregates may be of a limestone, siliceous or silico-calcareous nature. They include natural, artificial, waste and recycled materials. The aggregates may also comprise, for example, wood. The sand and the coarse aggregates may be river or crushed aggregates.

The hydraulic composition may comprise reinforcement elements, for example metal fibres and/or organic fibres and/or glass fibres and/or other reinforcement elements.

Admixtures may be added to the hydraulic composition, for example, a plasticizer or a superplasticizer, an anti-foaming agent (for example, polydimethyl siloxane). The admixtures may also correspond to silicones in the form of a solution, of a solid or preferably in the form of a resin, an oil or an emulsion, preferably in water. The quantity of such an agent in the hydraulic composition is generally at most of five parts by weight relative to the hydraulic binder.

The hydraulic composition may also comprise hydrophobic agents to increase water repulsion and reduce water absorption and penetration in solid structures comprising the hydraulic composition. Such agents comprise silanes, siloxanes, silicones and siliconates; commercially-available products comprise solvent-dilutable liquid and solid products, for example pellets.

The hydraulic composition may comprise a thickening agent (generally to increase the viscosity). Such agents comprise: derivatives of cellulose, for example water-soluble cellulose ethers, for example sodium carboxy methyl cellulose, sodium methyl cellulose, sodium ethyl cellulose, sodium hydroxy ethyl cellulose and sodium hydroxy propyl cellulose; alginates; and xanthan, carrageenan or guar gum. A mix of these agents may be used.

The hydraulic composition may comprise an internal curing agent to even further reduce water losses during the setting and the first days of hardening of the hydraulic composition. The curing agent is then present in the mass of the hydraulic composition. Examples of curing agents are paraffin and the product commercialised under the brand name of Rheocure 736 by BASF.

The hydraulic composition may comprise an activating agent which makes it possible to improve the hydration reactions of the vitreous materials. Such agents comprise sodium and/or calcium salts.

The hydraulic composition may comprise an accelerator and/or an air-entraining agent and/or a retarder.

The hydraulic composition may comprise a clay inertant. Clay inertants are compounds which permit the reduction or prevention of the harmful effect of clays on the properties of hydraulic binders. Clay inertants include those described in WO 2006/032785 and WO 2006/032786.

The water/hydraulic binder ratio is defined as the mass ratio between the quantity of water W and the sum of the quantities of cement and of all the pozzolanic materials B: it is generally from 0.15 to 1, preferably from 0.3 to 0.7.

An example of process for the production of a hydraulic composition comprises a step of mixing at least:
1 part by weight of the hydraulic binder according to the present invention;
from 2 to 10 parts by weight of aggregates; and
from 0.25 to 0.7 parts by weight of water.

The different elements of the hydraulic composition may be added together or separately.

The hydraulic composition may be poured according to known methods in the art. A thermal treatment of the hydraulic composition may be used after the pouring step.

The hydraulic composition may be used in a pre-cast plant or on a construction jobsite. The hydraulic composition may be used for the production of a shaped articles for the construction field, for example, a slab, a floor, a screed, a foundation, a base, a shear wall, a beam, a work top, a pillar, a bridge pier, a block of foamed concrete, a pipe, a conduit, a post, a stair, a panel, a cornice, a mold, a road system component (for example a border of a pavement), a roof tile, a surfacing (for example of a road), a jointing plaster (for example for a wall) and an insulating component (acoustic and/or thermal).

The aggregates and the hydraulic binder obtained according to the process of the invention may be associated in dry binder mixes (without added water).

The mass proportions relative to the total mass of the mix of the different constituents may then be defined as follows:
at least 5% of the hydraulic binder; and
up to 95% of aggregates.

A thus defined dry binder mix is a ready-mix dry concrete, which can be used by simply mixing with water.

BRIEF DESCRIPTION OF THE DRAWING

FIG. 1 represents an example of a curve of the evolution of the thermal flux as a function of time obtained for the hydration of a Portland cement.

EXAMPLES

The present invention is described by the following examples provided for non-restricting purposes relative to the only figure which represents an example of the trend of an evolution curve of the thermal flux during the hydration of a cement paste. The materials used in these examples are available from the following suppliers:

| Products or materials | Suppliers |
| --- | --- |
| Portland cement | Lafarge, France, Le Teil |
| Portland clinker-1 | Lafarge, France, Le Teil |
| Portland clinker-2 | Lafarge, France, Le Havre |
| Portland clinker-3 | Lafarge, France, Port La Nouvelle |
| Calcium sulphate-1 | Lafarge Plâtres |
| Calcium sulphate-2 | Lafarge Plâtres |
| Calcium sulphate-3 | Anhydrite Minérale France |
| 0/4 mm Sand | Société Nouvelle du Littoral |
| CSH powder, Circolit ™ | Cirkel |
| PCP-1 | BASF |
| PCP-2 | BASF |
| Solution of TEA | Aldrich |
| Antioxidant | Suzhou TSLA I/E Co Ltd |

The Portland cement was a CEM I 52.5R CE CP2 NF cement.

The clinker-1 was a Portland clinker.

The clinker-2 was a Portland clinker ground to 5000 cm$^2$/g of Blaine specific surface.

The clinker-3 was a Portland clinker.

The Calcium sulphate-1 was a gypsum having the formula $CaSO_4 \cdot 2H_2O$.

The Calcium sulphate-2 was a commercial product sold under the name Prestia Selecta™. It was a ground hemihydrate in the β form having the formula $CaSO_4 \cdot \frac{1}{2}H_2O$.

The Calcium sulphate-3 was an anhydrite having the formula $CaSO_4$.

The sand was a siliceous sand in conformity with the standardized sand described in the EN 196-1 Standard entitled <<Méthode d'essais des ciments—Partie 1—Détermination des résistances mécaniques>> [*"Test Method of cements—Part 1—Determination of the mechanical strength"*].

The material comprising the calcium silicate hydrate was the product commercialised by Cirkel under the brand name of Circolit™. It was in the form of a powder comprising particles with a BET specific surface of about 32.4 m²/g, a $D_V10$ of 2.5 µm and a $D_V90$ of 31.7 µm.

The PCP-1 was a commercial product sold under the name Glenium ACE 30™. It was a superplasticizer of the PCP type which chemical nature is a polyethylene polycarboxylate glycol comprising a main chain carrying carboxylate functions and side chains of ethylene polyoxide. The density of the polymer's anionic charges was about 0.9 meq/g. The PCP-1 was a solution comprising 26% by mass, expressed as dry extract, of polyethylene polycarboxylate glycol.

The PCP-2 was a commercial product sold under the name Glenium ACE 456™. It was a superplasticizer of the PCP type which chemical nature is a polyethylene polycarboxylate glycol comprising a main chain carrying carboxylate functions and side chains of ethylene polyoxide. The PCP-2 was a solution comprising 30% by mass, expressed as dry extract, of polyethylene polycarboxylate glycol.

The solution of TEA was a grinding agent commercialised by Aldrich and corresponded to a solution comprising 50% by mass, expressed as dry extract, of triethanolamine.

The Antioxidant was a propyl gallate in the form of a solution having 10% by mass of dry extract.

The $D_V10$ and $D_V90$ values of the particles were measured using a laser Malvern MS2000 granulometer. The measurement was carried out in ethanol. The source of light was constituted by a red He—Ne (632 nm) laser and a blue diode (466 nm). The optical model was that of Mie, the calculation matrix was of the polydisperse type.

The apparatus was verified before each work session using a standard sample (Sifraco 010 silica) for which the particle size distribution is known.

The measurements were carried out with the following parameters: pump speed 2300 rpm and stirrer speed 800 rpm. The sample was introduced in order to establish an obscuration from 10% to 20%. The measurement was carried out after stabilisation of the obscuration. Ultrasound at 80% was first applied for one minute to ensure the de-agglomeration the sample. After 30 seconds (to remove any possible air bubbles), a measurement was carried out for 15 seconds (15000 images analysed). The measurement was repeated at least twice without emptying the cell to verify the stability of the result and the removal of possible bubbles.

All values given in the description and the specified ranges correspond to average values obtained with ultrasound.

Particle sizes greater than 200 µm are generally determined by sieving.

Grinding Method

The mix comprising the clinker-1 (and optionally the material comprising the calcium silicate and admixtures) was ground according to the procedure described herein after. The mill used was a MALX 41 mill capable of containing 10 kg of material to be ground and having 60 kg of metal balls, of which 27 kg of the balls had an average diameter from 40 to 60 mm, 18 kg of the balls had an average diameter from 25 to 35 mm and 15 kg of the balls had an average diameter from 20 to 25 mm. The mill was used at a speed of 40 revolutions per minute. The grinding steps were the following:

- introduction of the clinker-1 in the form of particles with a maximum size less than or equal to 3.15 mm, and optionally the material comprising the calcium silicate hydrate into the mill, at 20° C.;
- optionally spraying the admixture onto the clinker;
- grinding for 2750 revolutions, then opening the mill;
- introduction of the Calcium sulphate-1;
- grinding for 1620 revolutions;
- installation of the draining grid in order to recover the cement of the desired size during the last grinding revolutions;
- control of the clinker's Blaine Specific Surface according to the EN 196-6 Standard.

Method for Production of a Mortar

The mortar was produced according to the procedure described herein after:

1) introduction of the sand into the bowl of a Perrier mixer;
2) from 0 to 30 seconds: start mixing at low speed (140 revolutions per minute) and introduce the pre-wetting water in 30 seconds;
3) from 30 seconds to 1 minute, mix the sand+pre-wetting water for 30 seconds;
4) from 1 minute to 5 minutes, let rest for 4 minutes;
5) from 5 minutes to 6 minutes, introduce the hydraulic binder (=Portland cement for comparison example; the co-ground binder as obtained herein above for examples 1 to 7);
6) from 6 minutes to 7 minutes, mix for 1 minute at low speed;
7) from 7 minutes to 7 minutes and 30 seconds, introduce the mixing water whilst mixing at low speed;
8) from 7 minutes and 30 seconds to 9 minutes and 30 seconds, mix for 2 minutes at high speed (280 revolutions per minute).

Measurement Method of the Compressive Strength at 8 Hours

The compressive strength was measured on a sample having a square base the side of which was 4 cm and a height of 16 cm and it was made in a mould of polystyrene. The measurement step of the compressive strength was carried out according to the measurement process of the compressive strength described in paragraph 9.2 of the EN 196-1 Standard entitled <<Méthodes d'essais des ciments—Partie 2—Détermination des résistances mécaniques>> [*"Cement Test Methods—Part 2—Determination of the mechanical strength"*].

Method for Production of a Cement Paste and Measurement of the Thermal Flux of the Cement Paste The measurement of the thermal flux released by a cement paste was carried out using an isotherm calorimeter with 8 channels TamAir. The measurement process of the thermal flux comprised measuring the difference of thermal flux between an empty reference cell and a cell comprising the cement paste.

The method for production of the cement paste and measurement of the thermal flux of the cement paste comprised the following steps:

1) start up the calorimeter;
2) weigh 8 grams of binder;
3) introduce 4 grams of demineralised water at 20° C. This corresponds to the start time for the measurements;
4) mix the cement and water using a spatula for 1 minute;
5) withdraw approximately 5 grams of the cement paste and put it in the cell of the calorimeter;
6) weigh the cell in order to precisely determine the mass of the introduced paste;
7) close the cell and put it in the enclosure of the calorimeter, the temperature of which is adjusted to 20° C.;
8) record the thermal flux released by the cement paste for 48 hours with an measurement period of 20 seconds for the first 4 hours and 60 seconds up to 48 hours.

FIG. 1 represents an example of a curve of the evolution of the thermal flux obtained for the hydration of a Portland cement.

The following parameters were determined from the evolution curve of the thermal flux:

the tmin instant at which the thermal flux was minimum at the beginning of the hydration of the hydraulic binder:

the tmax instant at which the thermal flux was maximum after the tmin instant; and the value of the cumulated thermal flux at 8 hours. The cumulated thermal flux at 8 hours corresponded to the integral of the curve from the tmin instant up to 8 hours.

An increase of the cumulated thermal flux at 8 hours corresponds to an acceleration of the hydraulic binder's hydration reactions, which entrain an increase of strength during the early ages.

Example 1 (Comparison Example)

Cement Paste Produced with Cement, Without Co-Grinding

A cement paste, P1 was made by mixing a binder, B1 with water. The B1 binder corresponded to the Portland cement. The water/binder ratio (cement) of the P1 cement paste was 0.5. The Portland cement comprised approximately 95% by mass of clinker.

A cement paste, P2 was made by mixing a binder, B2 with water. The B2 binder corresponded to a mix of the Portland cement and 0.8% by dry mass of the Circolit™ product relative to the mass of clinker. The water/binder ratio (cement+Circolit™ product) of the P2 cement paste was 0.5.

A cement paste, P3 was made by mixing a binder, B3 with water. The B3 binder corresponded to a mix of the Portland cement and 5.0% by dry mass of the Circolit™ product relative to the mass of clinker. The water/binder ratio (cement+Circolit™ product) of the P3 cement paste was 0.5.

The instants when the thermal flux of the cement paste was minimum and maximum were measured for each cement paste, P1, P2 and P3. The value of the cumulated thermal flux was determined from the evolution curve of the thermal flux.

The results are given in table (1).

cumulated flux at 8 hours between the cement paste P3 and the cement paste P1 was 42%.

Example 2

Cement Paste Produced with Clinker Co-Ground with a Material Comprising Calcium Silicate Hydrate The material comprising calcium silicate hydrate corresponded to the Circolit™ product.

A cement paste, P4 was made for comparisons by mixing a binder, B4 with water. The B4 binder corresponded to a co-grinding, according to the previously described grinding method, 5000 g of Portland clinker-1 and 177.6 g of Calcium sulphate-1. The water/binder ratio (clinker+gypsum) of the P4 cement paste was 0.5. The number of revolutions of the previously described co-grinding method was determined so that the Blaine specific surface of the mix of co-ground clinker and gypsum was approximately 4200 $cm^2/g$.

A cement paste, P5 was made by mixing a binder, B5 with water. The B5 binder corresponded to a co-grinding, according to the previously described grinding method, 5000 g of Portland clinker-1, 177.6 g of Calcium sulphate-1 and 0.8% by dry mass of the Circolit™ product relative to the mass of clinker. The water/binder ratio (clinker+gypsum+Circolit™ product) of the P5 cement paste was 0.5.

A cement paste, P6 was made by mixing a binder, B6 with water. The B6 binder corresponded to a co-grinding, according to the previously described grinding method, 5000 g of Portland clinker-1, 177.6 g of Calcium sulphate-1 and 2.1% by dry mass of the Circolit™ product relative to the mass of clinker. The water/binder ratio (clinker+gypsum+Circolit™ product) of the P6 cement paste was 0.5.

The instants when the thermal flux of the cement paste were minimum and maximum were measured for each

TABLE (1)

| Cement paste | Circolit ™ powder (% by dry mass relative to the mass of clinker) | Nature of the admixture (% by mass expressed as dry extract relative to the mass of clinker) | tmin minimum flux instant (h) | tmax maximum flux instant (h) | Cumulated flux at 8 h (J/g) |
|---|---|---|---|---|---|
| P1 | — | — | 1.62 | 9.45 | 63.9 |
| P2 | 0.8% | — | 1.32 | 9.30 | 65.9 |
| P3 | 5.0% | — | 0.96 | 8.03 | 90.6 |

The decrease of the maximum flux instant between the cement paste P2 and the cement paste P1 was 2%. The increase of the cumulated flux at 8 hours between the cement paste P2 and the cement paste P1 was 3%. The increase of the cement paste, P4, P5 and P6. The value of the cumulated thermal flux was determined from the evolution curve of the thermal flux.

The results are given in table (2).

TABLE (2)

| Cement paste | Circolit ™ powder (% by dry mass relative to the mass of clinker) | Nature of the admixture (% by mass expressed as dry extract relative to the mass of clinker) | tmin minimum flux instant (h) | tmax maximum flux instant (h) | Cumulated flux at 8 h (J/g) |
|---|---|---|---|---|---|
| P4 | — | — | 2.29 | 9.50 | 44.54 |
| P5 | 0.8% | — | 2.07 | 9.05 | 49.88 |
| P6 | 2.1% | — | 1.72 | 8.02 | 58.34 |

The decrease of the maximum flux instant between the cement paste P5 and the cement paste P4 was 5%. The decrease of the maximum flux instant when 0.8% by dry mass of the Circolit™ product was added was higher when the clinker was co-ground with the Circolit™ product than when the cement (clinker already ground) was mixed with the Circolit™ product (example 1).

The increase of the cumulated flux at 8 hours between the cement paste P5 and the cement paste P4 was 12%. The increase of the cumulated flux at 8 hours when 0.8% by dry mass of the Circolit™ product was added was higher when the clinker was co-ground with the Circolit™ product than when the cement (clinker already ground) was mixed with the Circolit™ product (example 1).

Example 3

Cement Paste Produced with Clinker Co-Ground with the Material Comprising Calcium Silicate Hydrate in the Presence of a Grinding Agent The material comprising the calcium silicate hydrate corresponded to the Circolit™ product. The grinding agent was TEA.

A cement paste, P7 was made by mixing a binder, B7 with water. The B7 binder corresponded to a co-grinding, according to the previously described grinding method, 5000 g of Portland clinker-1, 177.6 g of Calcium sulphate-1, 310 ppm by mass of the TEA grinding agent relative to the mass of clinker and 0.8% by dry mass of the Circolit™ product relative to the mass of clinker. The water/binder ratio (clinker+gypsum+Circolit™ product) of the P7 cement paste was 0.5.

A cement paste, P8 was made by mixing a binder, B8 with water. The B8 binder corresponded to a co-grinding, according to the previously described grinding method, 5000 g of Portland clinker-1, 177.6 g of Calcium sulphate-1, 310 ppm by mass of the TEA grinding agent relative to the mass of clinker and 2.1% by dry mass of the Circolit™ product relative to the mass of clinker. The water/binder ratio (clinker+gypsum+Circolit™ product) of the P8 cement paste was 0.5.

The instants during which the thermal flux of the cement paste was minimum and maximum were measured for each cement paste, P7 and P8. The value of the cumulated thermal flux was determined from the evolution curve of the thermal flux.

The results are given in table (3).

ground) was mixed with the Circolit™ product (example 1). Furthermore, the decrease of the maximum flux instant when 0.8% by dry mass of the Circolit™ product was added was higher when the clinker was co-ground with the Circolit™ product in the presence of TEA than when the clinker was co-ground with the Circolit™ product without TEA (example 2).

The increase of the cumulated flux at 8 hours between the cement paste P7 and the cement paste P4 was 55%. The increase of the cumulated flux at 8 hours when 0.8% by dry mass of the Circolit™ product is added was higher when the clinker was co-ground with the Circolit™ product in the presence of TEA than when the cement (clinker already ground) was mixed with the Circolit™ product (example 1). Furthermore, the increase of the cumulated flux at 8 hours when 0.8% by dry mass of the Circolit™ product was added was higher when the clinker was co-ground with the Circolit™ product in the presence of TEA than when the clinker was co-ground with the Circolit™ product without TEA (example 2).

Example 4

Cement Paste Produced with Clinker Co-Ground with a Material Comprising the Calcium Silicate Hydrate in the Presence of a Superplasticizer The material comprising the calcium silicate hydrate corresponded to the Circolit™ product. The superplasticizer was the PCP-1

A cement paste, P9 was made by mixing a binder, B9 with water. The B9 binder corresponded to a co-grinding, according to the previously described grinding method, 5000 g of Portland clinker-1, 177.6 g of Calcium sulphate-1, 0.1% by mass, expressed as dry extract, of PCP-1 relative to the mass of clinker and 0.8% by dry mass of the Circolit™ product relative to the mass of clinker. The water/binder ratio (clinker+gypsum+Circolit™ product) of the P9 cement paste was 0.5.

A cement paste, P10 was made by mixing a binder, B10 with water. The B10 binder corresponded to a co-grinding, according to the previously described grinding method, 5000 g of Portland clinker-1, 177.6 g of Calcium sulphate-1, 0.1% by mass, expressed as dry extract, of PCP-1 relative to the mass of clinker and 2.1% by dry mass of the Circolit™ product relative to the mass of clinker. The water/binder ratio

TABLE (3)

| Cement paste | Circolit ™ powder (% by dry mass relative to the mass of clinker) | Nature of the admixture (% by mass expressed as dry extract relative to the mass of clinker) | tmin minimum flux instant (h) | (max maximum flux instant (h) | Cumulated flux at 8 h (J/g) |
|---|---|---|---|---|---|
| P7 | 0.8% | TEA - 310 ppm | 1.69 | 8.28 | 69.08 |
| P8 | 2.1% | TEA - 310 ppm | 1.63 | 8.02 | 69.86 |

The decrease of the maximum flux instant between the cement paste P7 and the cement paste P4 was 13%. The decrease of the maximum flux instant when 0.8% by dry mass of the Circolit™ product was added was higher when the clinker was co-ground with the Circolit™ product in the presence of TEA than when the cement (clinker already (clinker+gypsum+Circolit™ product) of the P10 cement paste was 0.5.

The instants during which the thermal flux of the cement paste was minimum and maximum were measured for each cement paste, P9 and P10. The value of the cumulated thermal flux was determined from the evolution curve of the thermal flux.

The results are given in table (4).

TABLE (4)

| Cement paste | Circolit ™ powder (% by dry mass relative to the mass of clinker) | Nature of the admixturie (% by mass expressed as dry extract relative to the mass of clinker) | tmin minimum flux instant (h) | tmax maximum flux instant (h) | Cumulated flux (J/g) |
|---|---|---|---|---|---|
| P9 | 0.8% | PCP-1 (0.1%) | 1.93 | 8.81 | 59.09 |
| P10 | 2.1% | PCP-1 (0.1%) | 1.59 | 8.14 | 70.43 |

The decrease of the maximum flux instant between the cement paste P9 and the cement paste P4 was 7%. The decrease of the maximum flux instant when 0.8% by dry mass of the Circolit™ product was added was higher when the clinker was co-ground with the Circolit™ product in the presence of the superplasticizer than when the cement (clinker already ground) was mixed with the Circolit™ product (example 1). Furthermore, the decrease of the maximum flux instant when 0.8% by dry mass of the Circolit™ product was added was higher when the clinker was co-ground with the Circolit™ product in the presence of the superplasticizer than when the clinker was co-ground with the Circolit™ product without the superplasticizer (example 2).

The increase of the cumulated flux at 8 hours between the cement paste P9 and the cement paste P4 was 33%. The increase of the cumulated flux at 8 hours when 0.8% by dry mass of the Circolit™ product is added is higher when the clinker was co-ground with the Circolit™ product in the presence of the superplasticizer than when the cement (clinker already ground) was mixed with the Circolit™ product (example 1). Furthermore, the increase of the cumulated flux at 8 hours when 0.8% by dry mass of the Circolit™ product was added was higher when the clinker was co-ground with the Circolit™ product in the presence of the superplasticizer than when the clinker was co-ground with the Circolit™ product without the superplasticizer (example 2).

The increase of the cumulated flux at 8 hours between the cement paste P10 and the cement paste P4 was 58%. The increase of the cumulated flux at 8 hours when 0.8% by dry mass of the Circolit™ product was added was higher when the clinker was co-ground with the Circolit™ product in the presence of the superplasticizer than when the cement (clinker already ground) was mixed with 5.0% by dry mass of the Circolit™ product (example 1).

Example 5 (Comparison Example)

Mortar Produced with Cement, without Co-Grinding

The B1, B2 and B3 binders were used. Three mortars, M1, M2 and M3 were produced.
The M1 mortar had the following formulation:

| | |
|---|---|
| Water/Binder | 0.5 |
| B1 binder | 900 g |
| 0/4 mm sand | 2700 g |
| Superplasticizer | 0.105% by mass, expressed as dry extract, relative to the mass of B1 |
| Total water including the pre-wetting water | 450 g 162 g |
| mixing water | 285.3 g |

The superplasticizer was the PCP-1. The total water comprised, in particular, the water supplied by the superplasticizer.

The M2 mortar had the same formulation as the M1 mortar the difference being that the 900 g of the B1 binder were replaced by 900 g of the B2 binder.

The M3 mortar had the same formulation as the M1 mortar the difference being that the 900 g of the B1 binder were replaced by 900 g of the B3 binder.

The compressive strength of the mortar at 8 hours was measured. The results are given in table (5).

TABLE (5)

| Mortar | Circolit ™ powder (% by dry mass relative to the mass of clinker) | Nature of the admixture during the co-grinding (% by mass expressed as dry extract relative to the mass of clinker) | Compressive strength at 8 hours (MPa) |
|---|---|---|---|
| M1 | — | — | 2.5 |
| M2 | 0.8% | — | 3.2 |
| M3 | 5.0% | — | 5.8 |

The increase of the compressive strength at 8 hours between the M2 mortar and the M1 mortar was 28%. The increase of the compressive strength at 8 hours between the M3 mortar and the M1 mortar was 132%.

Example 6

Mortar Produced with Clinker Co-Ground with a Material Comprising the Calcium Silicate Hydrate in the Presence of a Grinding Agent The B4, B7, B8 binders were used. Three mortars, M4, M5 and M6 were made.
The M4 mortar had the following formulation:

| | |
|---|---|
| Water/Binder | 0.5 |
| B4 binder | 900 g |
| 0/4 mm sand | 2700 g |
| Superplasticizer | 0.115% by mass, expressed as dry extract, relative to the mass of B4 |
| Total water including the pre-wetting water | 450 g 162 g |
| Mixing water | 285.8 g |

The superplasticizer was the PCP-1.
The M5 mortar had the same formulation as the M4 mortar the difference being that the 900 g of the B4 binder were replaced by 900 g of the B7 binder.
The M6 mortar had the same formulation as the M4 mortar the difference being that the 900 g of the B4 binder were replaced by 900 g of the B8 binder.

The mortar's compressive strength at 8 hours was measured. The results are given in table (6).

TABLE (6)

| Mortar | Circolit ™ powder (% by dry mass relative to the mass of clinker) | Nature of the admixture during the co-grinding (% by mass expressed as dry extract relative to the mass of clinker) | Compressive strength at 8 hours (MPa) |
|---|---|---|---|
| M4 | — | | 1.8 |
| M5 | 0.8% | TEA - 310 ppm | 4.6 |
| M6 | 2.1% | TEA - 310 ppm | 5.1 |

The increase of the compressive strength at 8 hours between the M5 mortar and the M4 mortar was 156%. The increase of the compressive strength at 8 hours when 0.8% by dry mass of the Circolit™ product was added was higher when the clinker was co-ground with the Circolit™ product in the presence of TEA than when the cement (clinker already ground) was mixed with the Circolit™ product (example 1).

Example 7

Mortar Produced with Clinker Ground with a Material Comprising the Calcium Silicate Hydrate in the Presence of a Superplasticizer The B9 and B10 binders were used. Two mortars, M7 and M8 were made.
The M7 mortar had the following formulation:

| | |
|---|---|
| Water/Binder | 0.5 |
| B9 Binder | 900 g |
| 0/4 mm sand | 2700 g |
| Superplasticizer | 0.115% by mass, expressed as dry extract, relative to the mass of B9 |
| Total water | 450 g |
| Including the pre-wetting water | 162 g |
| Mixing water | 285.8 g |

The superplasticizer was the PCP-1.
The M8 mortar had the same formulation as the M7 mortar the difference being that 900 g of the B9 binder were replaced by 900 g of the B10 binder.
The mortar's compressive strength at 8 hours was measured. The results are given in table (7).

TABLE (7)

| Experiment | Circolit ™ powder (% by dry mass relative to the mass of clinker) | Nature of the admixture during the co-grinding (% by mass expressed as dry extract relative to the mass of clinker) | Compressive strength at 8 hours (MPa) |
|---|---|---|---|
| M7 | 0.8% | PCP-1 (0.1%) | 3.9 |
| M8 | 2.1% | PCP-1 (0.1%) | 5.4 |

The increase of the compressive strength at 8 hours between the M7 mortar and the M4 mortar was 117%. The increase of the compressive strength at 8 hours when 0.8% by dry mass of the Circolit™ product was added was higher when the clinker was co-ground with the Circolit™ product in the presence of the superplasticizer than when the cement (clinker already ground) was mixed with the Circolit™ product (example 1).

Example 8

Mortar Produced with Clinker Ground with a Slurry Comprising the Calcium Silicate Hydrate Preparation of the Slurry
The preparation, based on the continuous stirring of an aqueous solution comprising water, a PCP, an antioxidant, a clinker and a sulfate at 20° C., comprises the following steps:
  pour 1.5 liters of demineralized water in a container of 2 liters;
  add 287.25 g of clinker-2 and 12.75 g of Calcium sulphate-2;
  close the container and agitate with a Turbulat mixer;
  after 3 hours and 30 minutes, add 30 g of PCP-2;
  add the antioxidant (10% in dry weight compared to PCP);
  restart the agitation for a period varying from 4 to 6 days.
After these steps, the slurry was obtained, which is a diluted suspension of a hydrated hydraulic binder.
For examples M11 and M14, the slurry obtained herein above was centrifuged before co-grinding. The protocol of centrifugation was as follows:
  250 g of the slurry obtained herein above were separated into 4 tubes and placed in a centrifugation apparatus;
  centrifugation was performed at 5000 rpm for 5 minutes.
After centrifugation, each tube comprised four layers, from the bottom up:
  part containing particles of large particle size;
  part containing particles of small particle size;
  gel comprising CSH;
  aqueous solution.
Only the gel fraction was used for the co-grinding (about 50 g). The aqueous solution weighted about 100 g and the two bottom layers weighted about 100 g.
Protocol of Co-Grinding
The slurry obtained herein above was then co-ground with a clinker, following the protocol herein after:
  preheat the laboratory grinder at 100° C., the day before the grinding (provider of the grinder: Fachin LE TEIL);
  put 5 kg of clinker-3 and the solution of TEA in the grinder; (310 ppm by mass of the TEA grinding agent relative to the mass of clinker)
  add optionally the slurry in an amount of 5% by wet mass relative to the clinker (=around 1.06% by dry mass relative to the clinker);
  open the grinder after 500, 1000 and 1500 revolutions to allow water vapor to escape;
  add the Calcium sulphate-2 and the Calcium sulphate-3 (50/50 by mass) after 2000 revolutions (targeted $SO_3$: 3.5% by mass relative to the clinker for the binders without the addition of the slurry or the gel);
  stop the grinding after 3000 revolutions (targeted Blaine fineness: 4200 $cm^2/g$).
The temperature of the mill was controlled during the grinding around 100° C.
For examples M11 and M14, the slurry was replaced by the gel fraction obtained herein above in an amount of 1% by wet mass relative to the clinker (=around 0.35% by dry mass relative to the clinker).
Dry Mass of the Slurry and the Gel
The dry mass of the slurry and the gel corresponded to the estimated quantity of cement hydrates (including calcium silicate hydrate) respectively in the slurry or the gel. The estimation methods are described herein after. As a starting point, it was considered that 1 g of cement needs 0.3 g of water to hydrate completely.

Slurry:

The slurry prepared herein above comprised 1500 g of water, 300 g of cement (287.3 g of clinker and 12.7 g of calcium sulphate) and 30 g of PCP (total weight: 1830 g). 300 g of cement need 87 g of water to hydrate completely. So 1830 g of slurry comprised 387 g of cement hydrates (with the hypothesis that 100% of the cement was hydrated). Consequently, 250 g of the slurry comprised 52.9 g of cement hydrates. Thus, when 250 g of the slurry was added to 5000 g of clinker for co-grinding, 52.9 g of cement hydrates were added. So, 1.1% of cement hydrates were added, by dry mass relative to the clinker.

Gel:

As said herein above, 250 g of the slurry comprised 52.9 g of cement hydrates. It was supposed that, after centrifugation, the cement hydrates were present in the gel (about 50 g) and in the two bottom layers (about 100 g) proportionally to the mass. Thus the gel comprised one third of the 52.9 g of cement hydrates, i.e. 17.6 g of cement hydrates. Thus, when 50 g of the gel were added to 5000 g of clinker for co-grinding, 17.6 g of cement hydrates were added. So, 0.4% of cement hydrates was added by dry mass relative to the clinker.

After cooling, the cement obtained herein above was used to prepare a mortar, according to the protocol herein after.

Preparation of the Mortar

The composition of the mortar was as follows:

| Cement | 25% by mass |
| --- | --- |
| 0/4 mm Sand | 75% by mass |
| Water | such that W/C = 0.4 |
| PCP-2 | 0.5% or 0.3% relative to cement |

For the comparison examples (M9 and M12), the cement was the cement as obtained herein above by co-grinding without the addition of the slurry or the gel, and for the examples according to the invention (M10, M11, M13 and M14), the cement was the cement as obtained herein above by co-grinding with the slurry or the gel The mortar was prepared according to the protocol as follows:
- add the sand and part of the water (typically 6% of the mass of sand) into the bowl of a Perrier mixer;
- mix during 1 minute at low speed (140 rpm);
- stop mixing during 4 minutes;
- add the cement and mix at low speed during 1 minute;
- add the remaining water comprising the PCP during 30 seconds;
- mix at low speed during 1 minute;
- mix at high speed (280 rpm) during 1 minute.

The mortar thus obtained was placed in a polystyrene mold. The evaluation of mechanical strength was performed on samples having dimensions as follows: 4 cm×4 cm×16 cm. The measurement method of the compressive strength at 8 hours was the same as that described in relation with examples 1 to 7.

The results obtained are presented in Table (8) herein after.

TABLE (8)

| Experiment | Slurry of CSH (% by mass relative to the mass of clinker) | Gel of CSH (% by mass relative to the mass of clinker) | PCP-2 added to mortar (% by mass relative to the mass of clinker) | Compressive strength at 8 hours (MPa) |
| --- | --- | --- | --- | --- |
| M9 | — | — | 0.5 | 3.2 |
| M10 | 5 | — | 0.5 | 7.0 |
| M11 | — | 1 | 0.5 | 9.4 |
| M12 | — | — | 0.3 | 5.0 |
| M13 | 5 | — | 0.3 | 9.5 |
| M14 | — | 1 | 0.3 | 13.7 |

Comparing M10 and M11 to M9, and M13 and M14 to M12, it can be seen from Table (8) that the mortars comprising CSH in the form of a slurry or a gel had better compressive strength at 8 hours than the mortars of the comparative examples that do not comprise CSH in the form of a slurry or a gel.

The invention claimed is:

1. A process for the production of a hydraulic binder, said process comprising co-grinding a clinker and 0.1 to 5% by dry mass relative to the mass of clinker, of a material comprising more than 15% by mass of calcium silicate hydrate relative to the solid fraction of the material, wherein a plasticizer or a superplasticizer is co-ground with the clinker, the material and optionally a grinding agent, the quantity of the plasticizer or superplasticizer being 0.05 to 3% by mass expressed as dry extract relative to the mass of clinker.

2. The process according to claim 1, wherein the material is obtained by hydration of a cement paste.

3. The process according to claim 1, wherein the calcium silicate hydrate is in the form of a powder, a gel or a suspension.

4. The process according to claim 1, wherein the grinding agent is co-ground with the clinker and the material, the quantity of the grinding agent being 0.01 to 0.5% by mass expressed as dry extract relative to the mass of clinker.

5. The process according to claim 4, wherein the grinding agent comprises triethanolamine.

6. The process according to claim 1, wherein the superplasticizer comprises a polyoxy alkylene polycarboxylate.

7. The process according to claim 1, comprising co-grinding a source of $SO_3$ with the clinker, the material, optionally the grinding agent and the plasticizer or superplasticizer.

8. The process according to claim 7, wherein the source of $SO_3$ comprises calcium sulphate.

9. The process according to claim 1, wherein the superplasticizer is selected from the group consisting of polyoxy ethylene/polyoxy proplylene polycarboxylates, polynaphthalene sulphonates, lignosulfonates, polymelamine sulphonates and mixtures thereof.

* * * * *